Patented Jan. 6, 1942

2,269,347

UNITED STATES PATENT OFFICE 2,269,347

SHELLAC-CASHEW NUT SHELL LIQUID MATERIAL REACTION PRODUCT

William F. Schaufelberger, Maplewood, N. J., assignor to The Harvel Corporation, a corporation of New Jersey No Drawing. Application February 11, 1938, Serial No. 189,931

5 Claims. (Cl. 260—24)

The present invention relates to methods of making products from shellac and cashew nut shell liquid and derivatives of cashew nut shell liquid, and to the products obtained by these methods.

The derivatives of cashew nut shell liquid suitable for use in the practice of the present invention are cardanol, described in U. S. Patent No. 2,098,824; polymerized cashew nut shell liquid, described in Patent No. 2,067,919; ethers of cashew nut shell liquid and ethers of cardanol, described in copending application Serial Number 733,986, filed July 6, 1934; residue obtained on distilling cashew nut shell liquid in making cardanol; also the cashew nut shell liquid products and derivatives described in the following U. S. Letters Patents 1,725,791 to 1,725,797, inclusive; 1,771,785; 1,771,786; 1,819,416; 1,821,095; 1,838,070 to 1,838,077, inclusive; 1,921,292; 1,921,293; 1,950,085; to each of which reference is hereby made.

Examples of the methods of the present invention and their uses together with the products obtained thereby are as follows:

*Example 1.*—One part by weight of shellac, one part of alcohol and one-quarter part of slightly polymerized cashew nut shell liquid, all dissolved together, coated on paper and heated at 90° C. for a few minutes to drive off the alcohol. The paper so coated can be rolled tightly on heated mandrels to form tubes whereby the cashew nut shell liquid-shellac composition flows and binds together the successive layers of paper. After being taken from the mandrels, the tubes can be cured at about 280° F. for about sixteen hours to react the shellac and cashew nut shell liquid and to form an infusible compound which has good electrical insulation characteristics and is resistant to water, moisture, oils, solvents and chemicals. A tube so made is suitable for use on cores of electric transformers.

*Example 2.*—From one-quarter to three parts of cashew nut shell liquid and one part of shellac, by weight, are dissolved together. Alcohol can be used as a common solvent and then evaporated. When dry and cold the cashew nut shell-shellac solution can be ground together to a powder which can be used for making the tubes of Example 1 and for other purposes.

*Example 3.*—Two hundred parts by weight of raw cashew nut shell liquid or slightly polymerized cashew nut shell liquid and one hundred pounds of shellac are heated for 7½ hours at 280° F. The resulting product can be milled on cloth to make flexible water and oil proofed fabric and so on and for electrical insulation. This reaction product of shellac and cashew nut shell liquid can be milled into rubber to add characteristics of resistance to oils, solvents and chemicals and to increase dielectric strength.

*Example 4.*—Five parts by weight of powdered shellac and one part of cashew nut shell liquid (raw or acid treated according to Patent 2,067,919 to leave it in the liquid state) are heated up to 300° F. until completely dissolved and then allowed to cool. The product is hard and brittle when cool and can be powdered.

*Example 5.*—Two parts by weight of cashew nut shell liquid which has been polymerized to the rubber-like state and one part of shellac are milled together on heated rubber rolls until they are thoroughly intermingled after which the mass is cured at 220° F. The cured mass can be used for various purposes, for example, it can be milled into rubber for given characteristics of resistance to oils, solvents and so on and to increase its dielectric strength.

Having thus described my invention, what I claim and desire to protect by Letters Patent is:

1. The method which comprises heating between about 220° F. and about 300° F. a mixture of shellac and material selected from the group consisting of cashew nut shell liquid, polymerized cashew nut shell liquid, cardanol, alkyl ethers of cashew nut shell liquid, alkyl ethers of cardanol and a phenolic residue obtained on distilling cashew nut shell liquid, to obtain a reaction product of the shellac and the selected material.

2. The reaction products of the method of claim 1.

3. The product obtained by heating a mixture of shellac and cashew nut shell liquid between about 220° F. and 300° F.

4. The product obtained by heating a mixture of shellac and cardanol between about 220° F. and 300° F.

5. The product obtained by heating, between about 220° F. and 300° F., a mixture of shellac and a phenolic residue obtained on distilling cashew nut shell liquid.

WILLIAM F. SCHAUFELBERGER.